United States Patent [19]
Bitting

[11] Patent Number: 5,826,364
[45] Date of Patent: Oct. 27, 1998

[54] SCENTED ANIMAL DECOY KIT WITH CARRYING CASE

[76] Inventor: David M. Bitting, 205 Basin Hill Rd., Duncannon, Pa. 17020

[21] Appl. No.: 753,203

[22] Filed: Nov. 21, 1996

[51] Int. Cl.$^6$ .................................................. A01M 31/06
[52] U.S. Cl. ........................................................ 43/2
[58] Field of Search ............................................ 43/2, 3

[56] References Cited

U.S. PATENT DOCUMENTS

| | | | |
|---|---|---|---|
| 2,885,813 | 5/1959 | Kratzert | 43/3 |
| 3,704,538 | 12/1972 | Gagnon | 43/3 |
| 4,773,178 | 9/1988 | Marek | 43/2 |
| 4,821,444 | 4/1989 | Remus | 43/2 |
| 5,199,204 | 4/1993 | Lowery | 43/2 |
| 5,274,942 | 1/1994 | Lanius | 43/2 |
| 5,459,958 | 10/1995 | Reinke | 43/2 |
| 5,515,367 | 5/1996 | Johnson | 43/2 |

FOREIGN PATENT DOCUMENTS 920340  3/1963  United Kingdom .................. 43/3

*Primary Examiner*—Kurt Rowan

[57] ABSTRACT

A scented animal decoy kit with carrying case including an inflatable animal-like structure that has a body. The body has a head member, a rear end, an under belly and at least one leg member. The body has an air tight compartment that is inflatable. The under belly has a valve for the allowing the inflation and deflation of the body. The leg member has a foot member and a vertical channel extending length wise therein and accessible through the foot member. Included is a support stand that has a telescoping rod coupled with an anchor stake. The telescoping rod is sized for positioning within the channel of the leg of the animal-like structure. The support stand is positioned within the channel to enable the animal-like structure to stand in an upright position. Lastly, a generally rectangular carrying case is provided and is expandable for receiving a deflated the animal-like structure for storage.

7 Claims, 4 Drawing Sheets

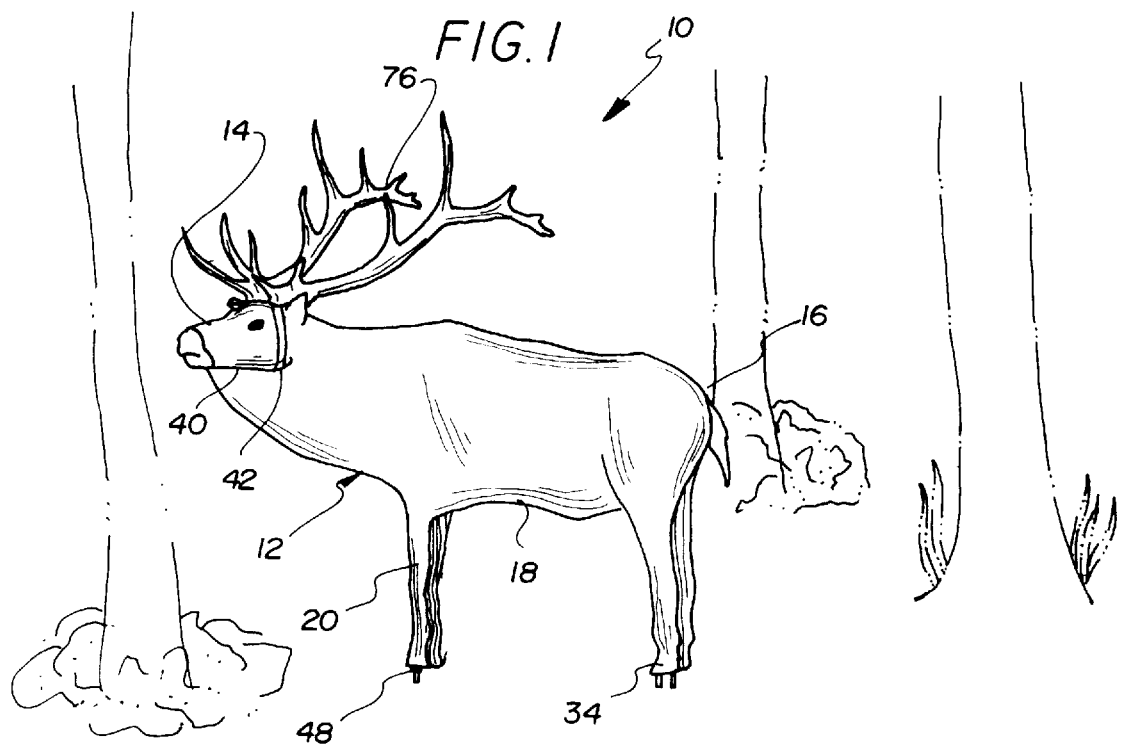
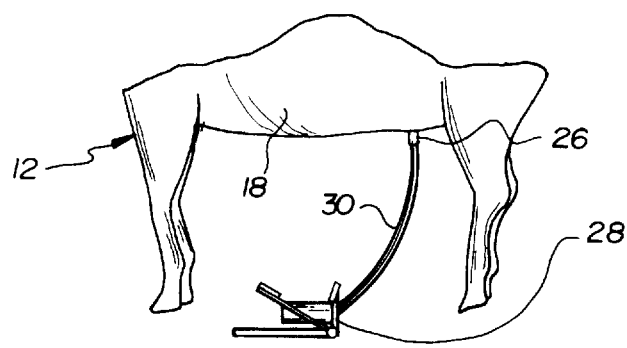

SCENTED ANIMAL DECOY KIT WITH CARRYING CASE

BACKGROUND OF THE INVENTION

1. Field of the Invention

The present invention relates to a scented animal decoy kit with carrying case and more particularly pertains to providing a fully dimensional inflatable decoy for use by hunters, guides, and nature watchers, that further includes attachable antlers and a scent holder.

2. Description of the Prior Art

The use of a decoy is known in the prior art. More specifically, decoys heretofore devised and utilized for the purpose of attracting game animals are known to consist basically of familiar, expected, and obvious structural configurations, notwithstanding the myriad of designs encompassed by the crowded prior art which has been developed for the fulfillment of countless objectives and requirements.

By way of example, U.S. Pat. Des. 356,620 to Weber and Jaion discloses an animal decoy. U.S. Pat. No. 5,199,204 to Lowery discloses a turkey decoy kit apparatus. U.S. Pat. No. 4,773,178 to Marek discloses a deer decoy. U.S. Pat. No. 4,753,028 to Farmer discloses a goose decoy. U.S. Pat. No. 4,758,530 to Ladehoff discloses a decoy with a plug-in leg assembly. Lastly, U.S. Pat. No. 4,651,457 to Nelson, Nelson and Williams discloses a decoy.

While these devices fulfill their respective, particular objectives and requirements, the aforementioned patents do not describe a scented animal decoy kit with carrying case that allows the user to have a realistic game animal decoy that is supported by telescoping rods on a stake, with the decoy having a scented insert sprayed with the desired animal's scent.

In this respect, the scented animal decoy kit with carrying case according to the present invention substantially departs from the conventional concepts and designs of the prior art, and in doing so provides an apparatus primarily developed for the purpose of providing a fully dimensional inflatable decoy for use by hunters, guides, and nature watchers, that further includes attachable antlers and a scent holder.

Therefore, it can be appreciated that there exists a continuing need for a new and improved scented animal decoy kit with carrying case which can be used for providing a fully dimensional inflatable decoy for use by hunters, guides, and nature watchers, that further includes attachable antlers and a scent holder. In this regard, the present invention substantially fulfills this need.

SUMMARY OF THE INVENTION

In view of the foregoing disadvantages inherent in the known types of decoys now present in the prior art, the present invention provides an improved scented animal decoy kit with carrying case. As such, the general purpose of the present invention, which will be described subsequently in greater detail, is to provide a new and improved scented animal decoy kit with carrying case and method which has all the advantages of the prior art and none of the disadvantages.

To attain this, the present invention essentially comprises an inflatable animal-like structure. The animal-like structure has a body with the appearance of a deer when inflated. The body has a head member, a rear end, an under belly and four leg members. The body has an air tight compartment housing a plurality of flexible baffles and is inflatable. The under belly has a valve for the allowing the inflation and deflation of the air tight compartment within the body. The air tight compartment is inflated for giving the body form. The baffles giving the body's form stability when the air tight compartment is inflated. Each of the four leg members has a foot member and a vertical channel extending length wise therein. The vertical channel is accessible through the foot member. The rear end has a pile-type fastener member attached. The head member has a chin with a pair of pile-type fastener members attached. Included are at least four support stands. Each support stand has a telescoping rod and an anchor stake. Each telescoping rod of each support stand is sized for positioning within one of the channels of the leg of the animal-like structure. The telescoping rod has a threaded bottom member. The anchor stake has a generally cylindrical top member with a threaded opening sized for receiving and coupling with the threaded bottom member of the telescoping rod. The four support stands are positioned within the channels and will enable the animal-like structure to stand in an upright position. The telescoping rod of each stand enables the user to raise and lower the animal-like structure being supported by the stand. A scented insert with an animal aromas provided. A tail member with tip portion and a cavity is included. The tip portion has a pile-type fastener member for coupling with the pile-type fastener member of the rear end of the body. The cavity is sized for receiving the scented insert when the tail is coupled to the rear end of the body. Also, inflatable antlers are included. The antlers have a strap portion that has a pair of end portions. Each end portion of the strap has a pile-type fastener member for coupling with one of the pair of pile-type fastener members of the chin of the head of the animal-like structure to position the antlers over the head. Lastly, a generally rectangular carrying case is provided. The carrying case has a front face, a rear face and a pair of accordion side panels therebetween. The rear face has a flap interconnected thereto and capable of coupling with the front face. The carrying case is expandable for receiving a deflated animal-like structure, the tail and deflated antlers for storage.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed wherein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved scented animal decoy kit with carrying case which has all of the advantages of the prior art decoys and none of the disadvantages.

It is another object of the present invention to provide a new and improved scented animal decoy kit with carrying case which may be easily and efficiently manufactured and marketed.

It is further object of the present invention to provide a new and improved scented animal decoy kit with carrying case which is of durable and reliable constructions.

An even further object of the present invention is to provide a new and improved scented animal decoy kit with carrying case which is susceptible of a low cost of manufacture with regard to both materials and labor, and which accordingly is then susceptible of low prices of sale to the consuming public, thereby making such scented animal decoy kit with carrying case economically available to the buying public.

Even still another object of the present invention is to provide a scented animal decoy kit with carrying case for providing a fully dimensional inflatable decoy for use by hunters, guides, and nature watchers, that further includes attachable antlers and a scent holder.

Lastly, it is an object of the present invention to provide a new and improved scented animal decoy kit with carrying case including an inflatable animal-like structure that has a body. The body has a head member, a rear end, an under belly and at least one leg member. The body has an air tight compartment that is inflatable. The under belly has a valve for the allowing the inflation and deflation of the body. The leg member has a foot member and a vertical channel extending length wise therein and accessible through the foot member. Included is a support stand that has a telescoping rod coupled with an anchor stake. The telescoping rod is sized for positioning within the channel of the leg of the animal-like structure. The support stand is positioned within the channel to enable the animal-like structure to stand in an upright position. Lastly, a generally rectangular carrying case is provided and is expandable for receiving a deflated the animal-like structure for storage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the scented animal decoy kit with carrying case constructed in accordance with the principles of the present invention.

FIG. 2 is a cut-away view of the body having the foot pump in an operable configuration.

The same reference numerals refer to the same parts through the various Figures.

DESCRIPTION OF THE PREFERRED EMBODIMENT

Figure 3:
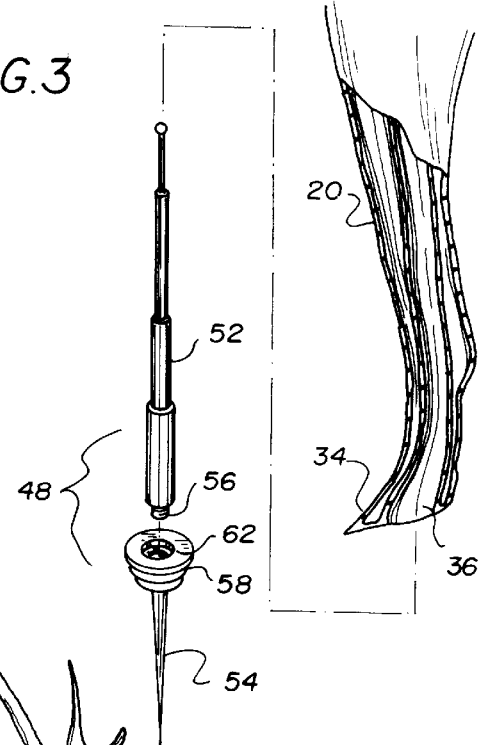
FIG. 3 is an exploded view of the support stand and the manner in which it is positioned in the channel of the leg.
Figure 4:
FIG. 4 is an isometric view of the antlers.

With reference now to the drawings, and in particular to FIG. 1 thereof, the preferred embodiment of the new and improved scented animal decoy kit with carrying case embodying the principles and concepts of the present invention and generally designated by the reference numeral 10 will be described.

The present invention, the scented animal decoy kit with carrying case 10 is comprised of a plurality of components. Such components in their broadest context include a body, a valve, a scent insert, a tail and a carrying case. Such components are individually configured and correlated with respect to each other so as to attain the desired objective.

Figure 5:
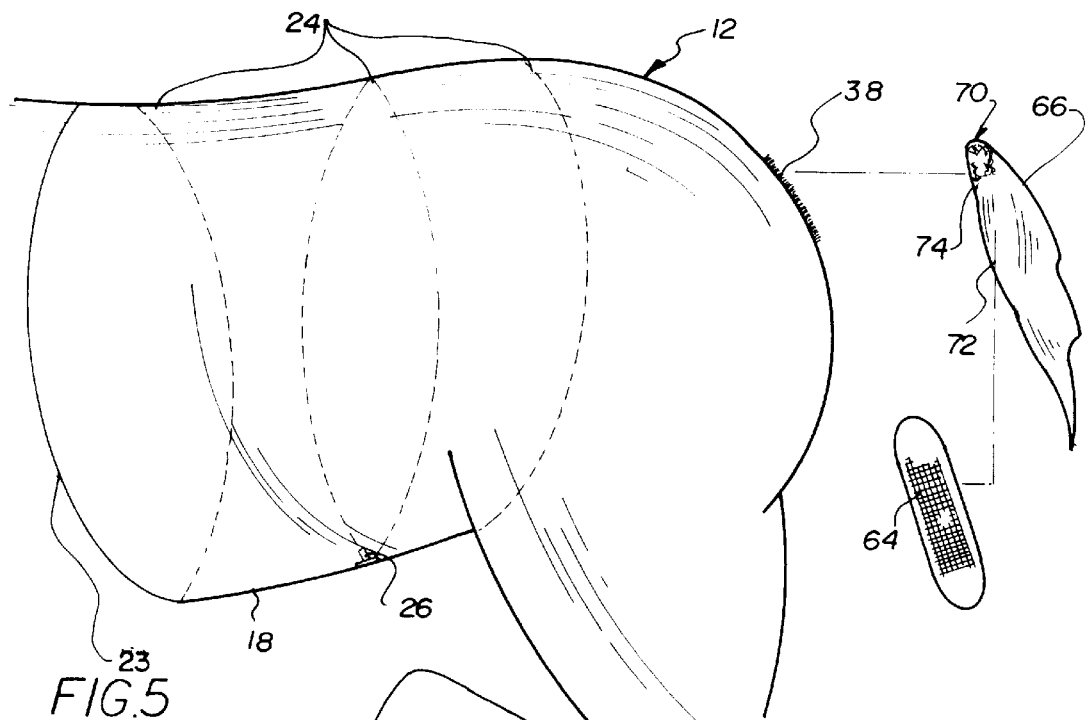
FIG. 5 is a cut-away view of the body depicting the rear end in an exploded orientation with the tail and the insert.
Figure 6:
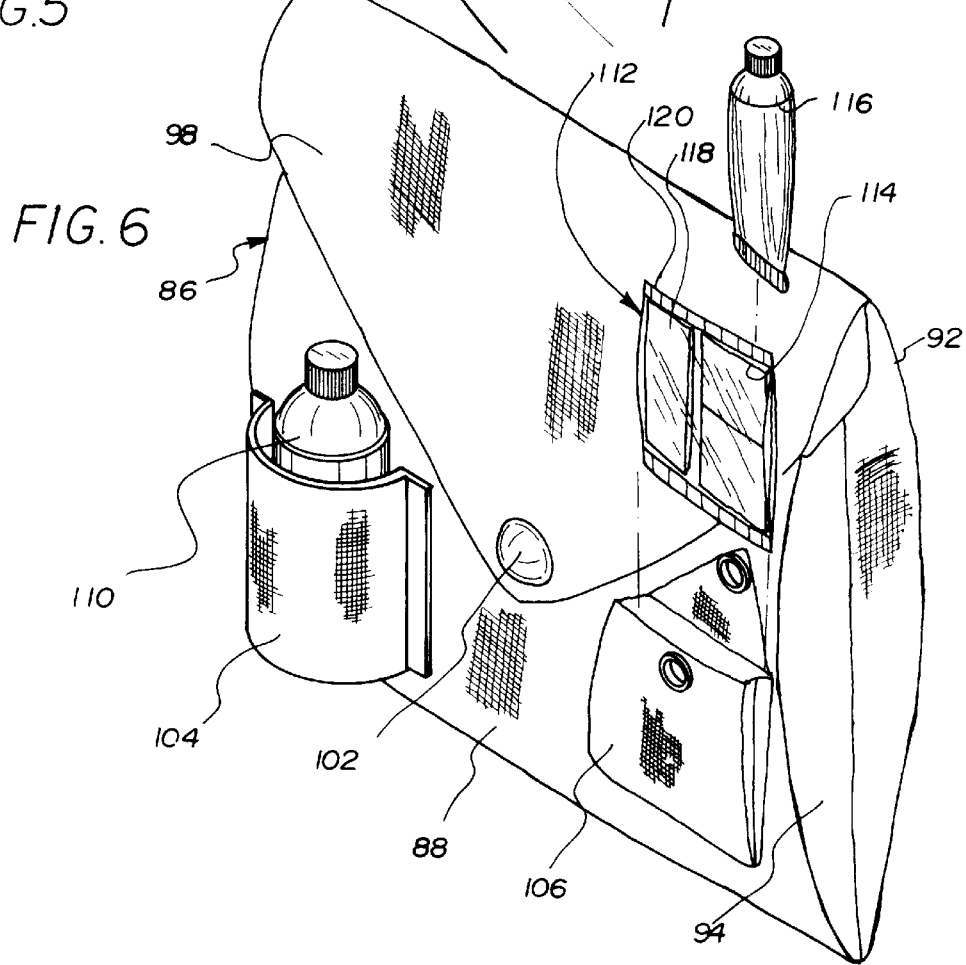
FIG. 6 is an isometric view of the carrying case.
Figure 7:
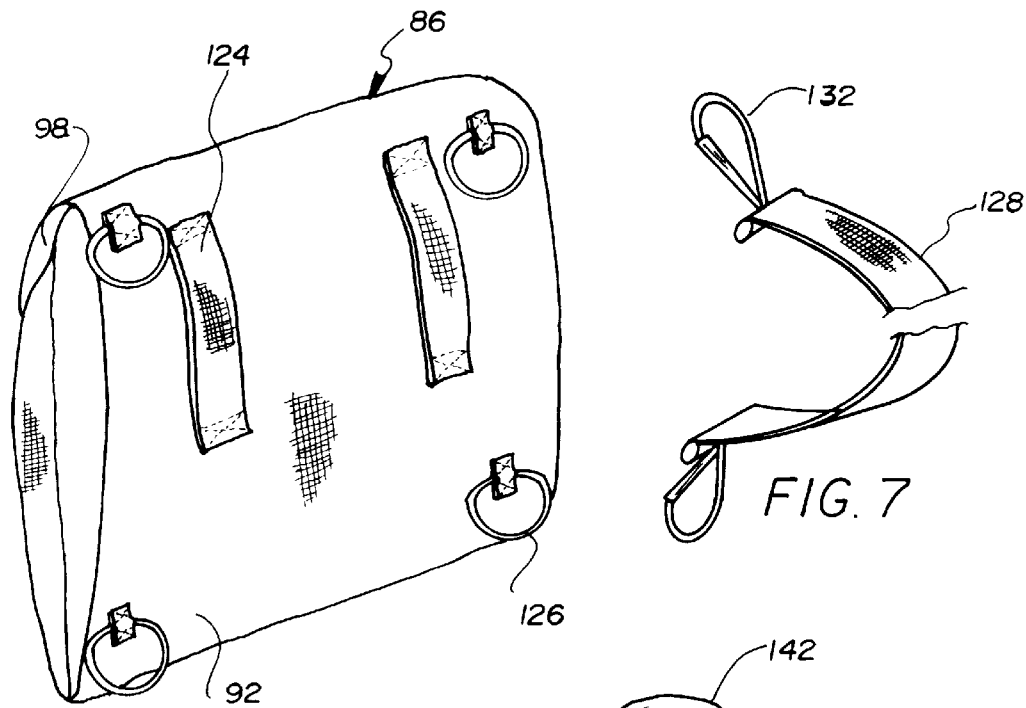
FIG. 7 is an exploded view of the carrying case and the shoulder strap attachment.

Specifically, the present invention includes an inflatable animal-like structure 12 that is formed of a plastic, such as polyvinlychloride. The animal-like structure has a body 12 with the appearance of a deer when inflated, as shown in FIG. 1. The exterior of the body is decorated so as to present a realistic visual appearance. The body has a head member 14, a rear end 16, an under belly 18 and four leg members 20. The body has an air tight compartment 23 housing a plurality of flexible baffles 24 and is inflatable. The baffles are thin rings formed from cylindrical metal rods. The baffles are light weight and spaced apart within the body, as seen in FIG. 5. The under belly has a valve 26 for the allowing the inflation and deflation of the air tight compartment within the body. The air tight compartment is inflated for giving the body form. The baffles giving the body's form stability when the air tight compartment is inflated. The body may be inflated by mouth, carbon dioxide cartridge or with a foot pump 28. As shown in FIG. 2, the foot pump has a hose 30 that is coupled with the valve. Once the desired air fill is reached the pump is separated and stored.

Each of the four leg members have a foot member 34 and a vertical channel 36. The vertical channel, as shown in FIG. 3, of each leg member extends length wise within the leg member and is accessible through the foot member. The rear end of the body has a pile-type fastener member 38 attached. The head member has a chin 40 with a pair of pile-type fastener members 42 attached.

Also, at least four support stands 48 are included. Each stand has a telescoping rod 52 and an anchor stake 54. Both the rod and the stake are formed of a light weight metal or metal alloy. Each telescoping rod of each support stand is sized for positioning within one of the channels 36 of the leg of the animal-like structure. FIG. 3 shows the placement for the telescoping rod within the channel. The telescoping rod has a threaded bottom member 56. The anchor stake has a generally cylindrical top member 58 with a threaded opening 62.

The treaded opening is sized for receiving and coupling with the threaded bottom member 56 of the telescoping rod 52. When the four support stands, are positioned within the channels, they will enable the animal-like structure to stand in an upright position. The telescoping rod of each stand enables the user to raise and lower the animal-like structure when it is supported by the stand as needed to attract other deer.

As best illustrated in FIG. 5, a scented insert 64 is included. The insert has an animal aroma. The aroma is either the scent of a male deer or a female deer. The insert is made of an absorbent material that may be disposed of after each use.

Additionally, a tail member 66 is provided. The tail member has a tip portion 70 and a cavity 72. The tip portion has a pile-type fastener member 74 for coupling with the pile-type fastener member 38 of the rear end of the body 12. The cavity is sized for receiving the scented insert 64 when the tail is coupled to the rear end of the body. The tail member is a washable fabric that allows cleaning after each use. Cleaning of the tail member is necessary when storing the structure between uses.

Included are inflatable antlers 76. The antlers are mounted onto a strap portion 78. The strap portion has a pair of end portions 82. Each end portion of the strap has a pile-type fastener member 84 for coupling with one of the pair of pile-type fastener members 42 of the chin of the head 14 of the animal-like structure to position the antlers over the head. The antlers make the animal-like structure look like a male deer to other deer.; and Lastly, a generally rectangular carrying case 86 is provided. The carrying case has a front face 88, a rear face 92 and a pair of accordion side panels 94 therebetween. The carrying case is leather of plastic. As, shown in FIG. 1, the rear face has a flap 98 that is interconnected and couples with the front face. The flap, as shown has a snap fastener 102. The carrying case is expandable for receiving a deflated animal-like structure, the tail and deflated antlers for storage.

Figure 8:
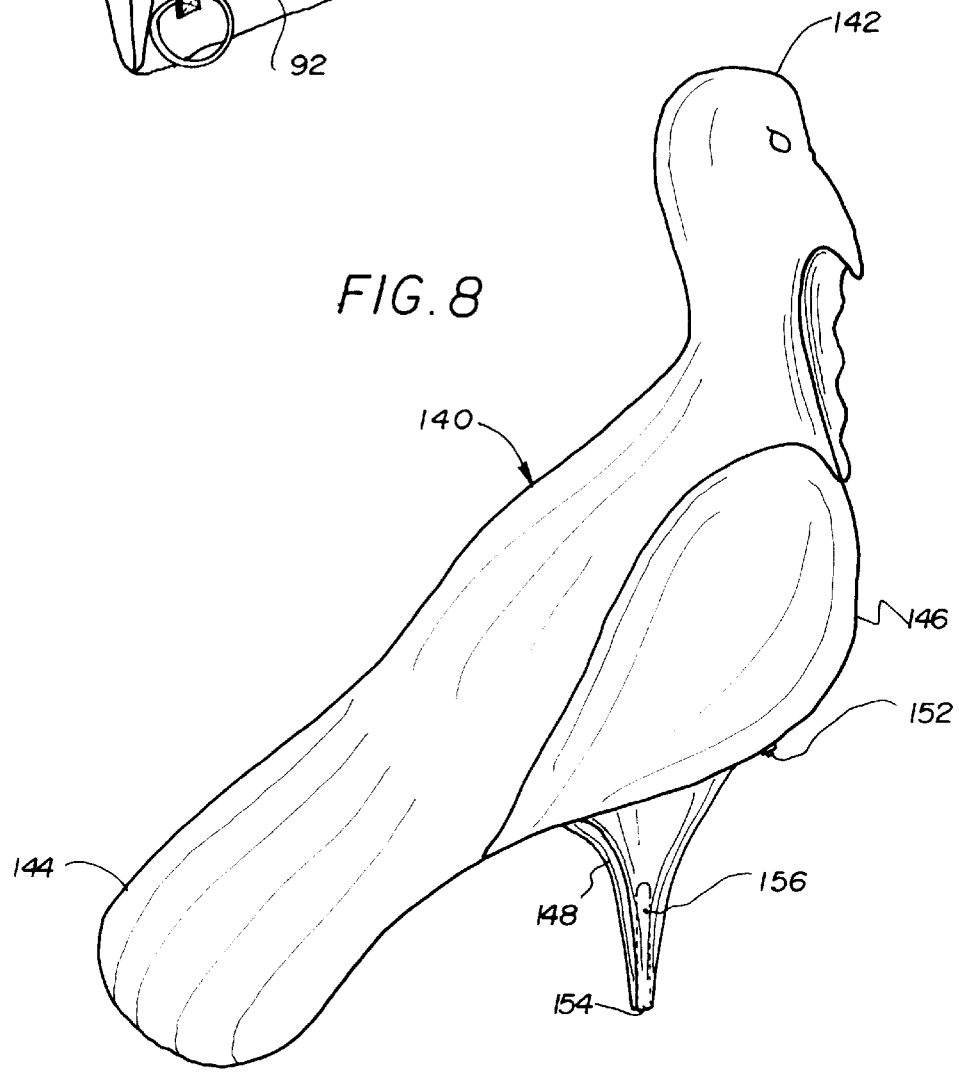
FIG. 8 is an alternative embodiment of the animal-like structure of the present invention.

Furthermore, the carrying case 86 has semi-cylindrical holders 104 and a generally rectangular pocket 106 on the front face. As shown in FIG. 8, the holder will support an aerosol can of scent 110. The flap has a pouch 112 with a slot 144 for a tube of plastic repair material 116 and a slot 118 for strips of plastic 120. The plastic material and strips may be used to repair small holes in the body. On the rear face 92 of the carrying case are a pair of belt holders 124 and a plurality of D-rings 126. The belt holders are spaced apart and will allow the carrying case, with the animal-like structure within, to be carried on the user's belt. A shoulder strap 128 with clips 132 is provided. The shoulder strap maybe coupled to atleast tow of the D-rings for transporting the carrying case 86.

The inflatable animal-like structure in not limited to having a body with a deer appearance when inflated. The body may look like a number of game animals, such as, elk and turkey. FIG. 8 shows the animal-like structure having a body with the appearance of a turkey 140 when inflated. The body has a head member 142, a rear end 144, an under belly 146 and at least one leg member 148. The body of this animal-like-structure is formed of a polyvinylchloride and has an air tight compartment that is inflatable. The under belly has a valve 152 for allowing the inflation and deflation of the body. The leg member, as shown in FIG. 8, has a bottom member 154 and a vertical channel 156 extending length wise therein and accessible through the bottom member. Any one of the support stands of FIG. 3 can be used within the channel of this animal-like structure. In the event, the support stands are too large, a reduced version can be manufactured.

The present invention scented animal decoy kit with carrying case is a three dimensional inflatable decoy. It is structured for easy transportation and features accessories, such as, attachable antlers and a scent holder. The body portion of the animal-like structure is made from heavy duty polyvinylchloride. The body has an airtight chamber that can be inflated with a foot pump, by mouth or with a carbon dioxide cartridge. The scent holder of the present invention is the tail. In all structures the tail has a cavity that will receive an insert that has been sprayed with an animal scent. Included with each animal decoy kit is a carrying case that is made of leather or plastic. Included with the carrying case is an easy to use vinyl repair kit and an aerosol can of animal scent.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A new and improved scented animal decoy kit with carrying case for attracting game animals comprising in combination:

an inflatable structure having a body with the appearance of a deer when inflated, the body having a head member, a rear end, an under belly and four leg members, the body having an air tight compartment housing a plurality of flexible baffles and being inflatable, the under belly having a valve for the allowing the inflation and deflation of the air tight compartment within the body, the air tight compartment being inflated for giving the body of the inflatable structure a form, the baffles giving the inflated body stability when the air tight compartment is inflated, each of the four leg members having a foot member and a vertical channel extending length wise therein and accessible through the foot member, the rear end having a pile-type fastener member attached thereto, the head member having a chin with a pair of pile-type fastener members attached thereto;

at least four support stands with each stand having a telescoping rod and an anchor stake, each telescoping rod of each support stand being sized for positioning within one of the channels of the leg of the inflatable structure, the telescoping rod having a threaded bottom member, the anchor stake having a generally cylindrical top member with a threaded opening sized for receiving and coupling with the threaded bottom member of the telescoping rod, the four support stands being positioned within the channels and will enable the inflatable structure to stand in an upright position, the telescoping rod of each support stand enabling the user to raise and lower the inflatable structure a scented insert having an animal aroma;

a tail member having tip portion and a cavity, the tip portion having a pile-type fastener member for coupling with the pile-type fastener member of the rear end of the body, the cavity being sized for receiving the scented insert when the tail is coupled to the rear end of the body;

inflatable antlers having a strap portion, the strap portion having a pair of end portions, each end portion of the strap having a pile-type fastener member for coupling with one of the pair of pile-type fastener members of the chin of the head of the inflatable structure to position the antlers over the head; and a generally rectangular carrying case having a front face, a rear face and a pair of accordion side panels therebetween, the rear face having a flap interconnected thereto and capable of coupling with the front face, the carrying case being expandable for receiving a deflated structure, the tail and deflated antlers for storage.

2. A scented animal decoy kit with carrying case comprising;

an inflatable structure having a body, the body having a head member, a rear end, an under belly and at least one leg member, the body having an air tight compartment being inflatable giving the body of the animal-like structure a form, the under belly having a valve for the allowing the inflation and deflation of the body, the body having a plurality of flexible baffles therein, the baffles giving the inflated body stability when the air tight compartment is inflated, and the rear end having a pile-type fastener member attached thereto, the leg member having a foot member and a vertical channel extending length wise therein and accessible through the foot member, the head member having a chin with a pair of pile-type fastener members attached thereto;

a support stand having a telescoping rod being coupled with an anchor stake, the telescoping rod being sized for positioning within the channel of said leg of the inflatable structure to enable said inflatable structure to stand in an upright position; and a generally rectangular carrying case being expandable for receiving a deflated structure for storage.

3. The animal decoy kit with carrying case as set forth in claim 2 wherein the telescoping rod having a threaded bottom member, and the anchor stake having a generally cylindrical top member with a threaded opening sized for receiving and coupling with the threaded bottom member of the telescoping rod.

4. The animal decoy kit with carrying case as set forth in claim 2, further including a scented insert having an animal aroma, and a tail member having a tip portion and a cavity.

5. The animal decoy kit with carrying case as set forth in claim 4 wherein the tip portion of the tail member having a pile-type fastener member for coupling with the pile-type fastener member of the rear end of the body, and the cavity of the tail member being sized for receiving the scented insert when the tail is coupled to the rear end of the body.

6. The animal decoy kit with carrying case as set forth in claim 2, further including inflatable antlers having a strap portion, the strap portion having a pair of end portions, each end portion of the strap having a pile-type fastener member for coupling with one of the pair of pile-type fastener members of the chin of the head member of the inflatable structure to position the antlers over the head to give the deer the appearance of being a male deer.

7. The animal decoy kit with carrying case as set forth in claim 6 wherein the inflatable antlers being deflatable for positioning within the carrying case with a deflated structure.

* * * * *